United States Patent [19]
Friesen

[11] Patent Number: 5,343,683
[45] Date of Patent: Sep. 6, 1994

[54] ROTARY MOWER HAVING MODIFIED "DELTA WING" SHAPE

[75] Inventor: Henry Friesen, Niagara Falls, Canada

[73] Assignee: Deere & Company, Moline, Ill.

[21] Appl. No.: 75,421

[22] Filed: Jun. 14, 1993

[51] Int. Cl.⁵ .......................................... A01D 34/66
[52] U.S. Cl. ........................................ 56/320.1; 56/6; 56/13.6
[58] Field of Search ............... 56/6, 13.6, 11.8, 55, 56/320.1, 17.5, 320.2, DIG. 20, DIG. 22, 295

[56] References Cited

U.S. PATENT DOCUMENTS

| | | | |
|---|---|---|---|
| 2,821,831 | 2/1958 | Thompson | 56/15.7 |
| 3,267,652 | 8/1966 | Dahlgren et al. | 56/6 |
| 3,400,521 | 9/1968 | Caldwell | 56/6 |
| 5,113,640 | 5/1992 | Colistro | 56/13.6 |

OTHER PUBLICATIONS

Deere & Company Advertising Brochure entitled: "Flail & Rotary Cutters", dated Nov., 1992, front and back cover and p. 19, published in U.S.A.
Deere & Company Advertising Brochure entitled: "Cutters & Shredders", dated Oct., 1992, front and back cover pages and p. 15, published in U.S.A.

*Primary Examiner*—Ramon S. Britts
*Assistant Examiner*—Pamela Anne O'Connor

[57] ABSTRACT

The leading profile of a winged rotary cutter includes diverging leading profile sections, beginning with outer profile sections of a center housing section extending to opposite sides of the center housing section and continuing with inner profile sections respectively of right and left wing housing sections hinged to opposite sides of the center housing section. The right and left wing housing sections further include outer leading profile sections joined to respective rear ends of the inner leading profile sections and extending at a right angle to the direction of travel so as not to deflect plant stems outwardly of the width of cut of the cutter.

2 Claims, 1 Drawing Sheet

ROTARY MOWER HAVING MODIFIED "DELTA WING" SHAPE

BACKGROUND OF THE INVENTION

The present invention relates to rotary mowers having flexible wing sections pivotally mounted onto the opposite sides of a center section and more specifically relates to the leading profile presented by the blade housings of the center and wing sections.

Presently there are two basic types of flexible wing rotary cutters, namely, so-called "box-front" and "delta wing" designs. The center and wing cutting sections of a cutter employing the box front design each present a front profile extending perpendicular to the direction of travel, with the center section disposed ahead of the wing sections whereby the combined profiles of the sections is a stepped profile. In contrast to this, the center and wing cutting sections of a cutter employing the delta wing design present a combined profile which is generally v-shaped with the profile being inclined relative to the direction of travel.

Cutters with the box-front profile work very good when traveling straight ahead since the profile will push and bend over crop stems or stalks forwardly allowing the crop to be lifted and cut-off cleanly as it passes beneath the cutter housing. However, in some crop conditions these cutters tend to leave streaks when mowing during turning due to the stems or stalks being bent over sideways by the side skirt/skid shoe structure at the opposite sides of the middle blade housing.

While rotary cutters having the delta wing design is preferred for appearance, material distribution and shielding reasons, the angled front profile tends to push stalks or stems to the side resulting in those stalks and stems at the outer edges of the cutter passing beneath and being held down by the side skirt/skid shoe structures at the outer ends of the wing sections preventing the material from being lifted and cut off. This results in requiring more overlap on the next pass through the field of crop being cut, especially with tall growth, and thus greatly reduces the effective cutting width of the cutter. Furthermore, this design makes it impossible to cut clean along a fence or building.

SUMMARY OF THE INVENTION

According to the present invention there is provided a winged rotary cutter having an improved front profile.

An object of the invention is to provide a winged rotary cutter having a front profile which avoids the problems mentioned above as being associated with cutters having the box-front and delta wing profile designs.

A more specific object of the invention is to provide a winged rotary cutter having a front profile which is like that of the delta wing design over the entire front of the center section and all but the outer portion of each of the wing sections, this outer portion being approximately perpendicular to the direction of travel.

These and other objects will become apparent from a reading of the ensuing description together with the appended drawings.

DESCRIPTION OF THE PREFERRED EMBODIMENT

Figure 1:
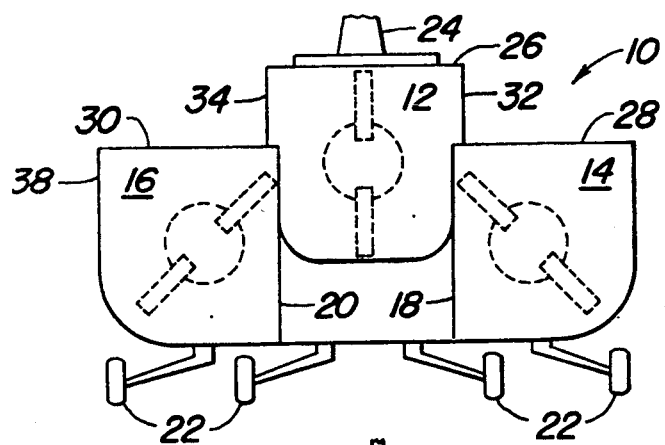
FIG. 1 is a schematic top plan view of a prior art rotary cutter of a box-front design.

Referring now to FIG. 1, there is schematically shown a prior art rotary cutter 10 of the so-called box-front design. The rotary cutter 10 includes a central main frame defined by a center blade housing section 12 having right and left wing housing sections 14 and 16, respectively, hinged thereto for pivoting or flexing about fore-and-aft axes located at 18 and 20. Respective hydraulically operated link assemblies (not shown) would normally be provided for folding the wing sections upwardly to transport positions. Ground wheels 22 are connected to each of the housing sections 12, 14 and 16 and normally this connection would be through a wheel axle assembly (not shown) that is made in three sections linked together and rockable by a hydraulic cylinder for adjusting the wheels vertically relative to the housing sections and thus the cutting height of the cutter. A hitch 24, only partly shown, is pivotally connected to the front end of the center blade housing section 12 and a clevis (not shown) would normally be connected to the front end of the hitch 24 and would be adapted for connecting the cutter 10 to the drawbar of a towing vehicle. The center housing section 12 is arranged partly ahead of the wing housing sections 14 and 16, with the sections having respective forward or leading profiles 26, 28 and 30 that extend at right angles to the direction of travel and thus cooperate to define a stepped forward profile. It is here noted that depending from opposite sides 32 and 34 of a top wall of the center housing section, and at outer front locations 36 and 38, respectively of the wing housing sections 14 and 16, are fore-and-aft extending side skirt/skid shoe structures (not shown). During straight-ahead cutting operation, the leading profiles 26, 28 and 30 will act to bend forwardly stems or stalks of plants being cut, the stems or stalks passing beneath the housing sections where they are caused to be lifted by the suction of the rotating blades, the blades then acting to cleanly cut off the stems or stalks. However, should cutting operation continue during turning of the cutter 10, the skirt/skid shoe structures may bend over and hold down plant stems and stalks in some areas such that the plants are not cleanly cut off resulting in streaks being left which are either uncut or not cut to the same level as the remainder of the cut swath.

Figure 2:
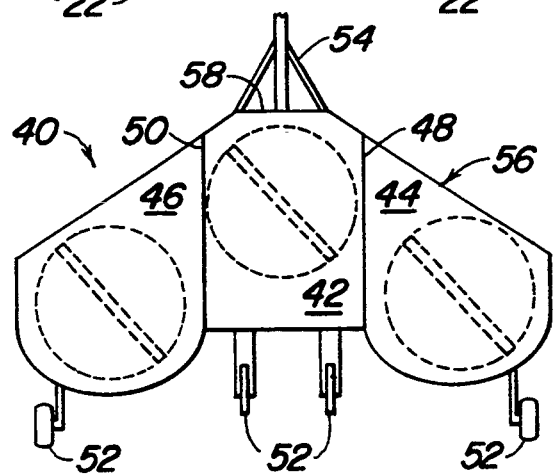
FIG. 2 is a schematic top plan view of a prior art rotary cutter of a delta wing design.

Referring now to FIG. 2, there is shown a schematic representation of a prior art rotary cutter 40 of the so-called delta wing design. This cutter is shown in the same schematic fashion used to depict the cutter 10, therefore, certain details referred to above in the description of the cutter 10 are omitted here with the understanding that the detailed description pertains to this cutter as well. The cutter 40 includes a main frame formed by a center housing section 42. Right and left wing housing sections 44 and 46 are respectively hinged opposite sides of the center section 42 for movement about fore-and-aft axes at 48 and 50. Ground wheels 52 are provided for supporting each of the housing sections 42, 44 and 46. A hitch 54 is pivotally attached to the front end of the center housing section 42. It is here noted that the forward or leading profile 56 defined by the housing sections 42, 44 and 46 is generally v-shaped, with all but a central portion 58 of the center housing section 42 being inclined to the direction of travel. During cutting operation, plant stalks or stems will be deflected outwardly by the inclined portions of the forward profile 56. When such deflection occurs near the outer ends of the wing housing sections 44 and 46, the stems or stalks may become trapped under the side skirt/skid shoe structures beneath the outer ends of these sections thus preventing the plants to be lifted and cleanly cut-off. This necessitates that the cutter be run to overlap the poorly cut strip the next pass through the field which, of course, reduces the effective cutting width of the cutter. Also, when operating close to a building or fence, it is impossible to cut-off the poorly cut strip in which case the poorly cut strip is left or another type of cutter must be used to finish the job.

Figure 3:
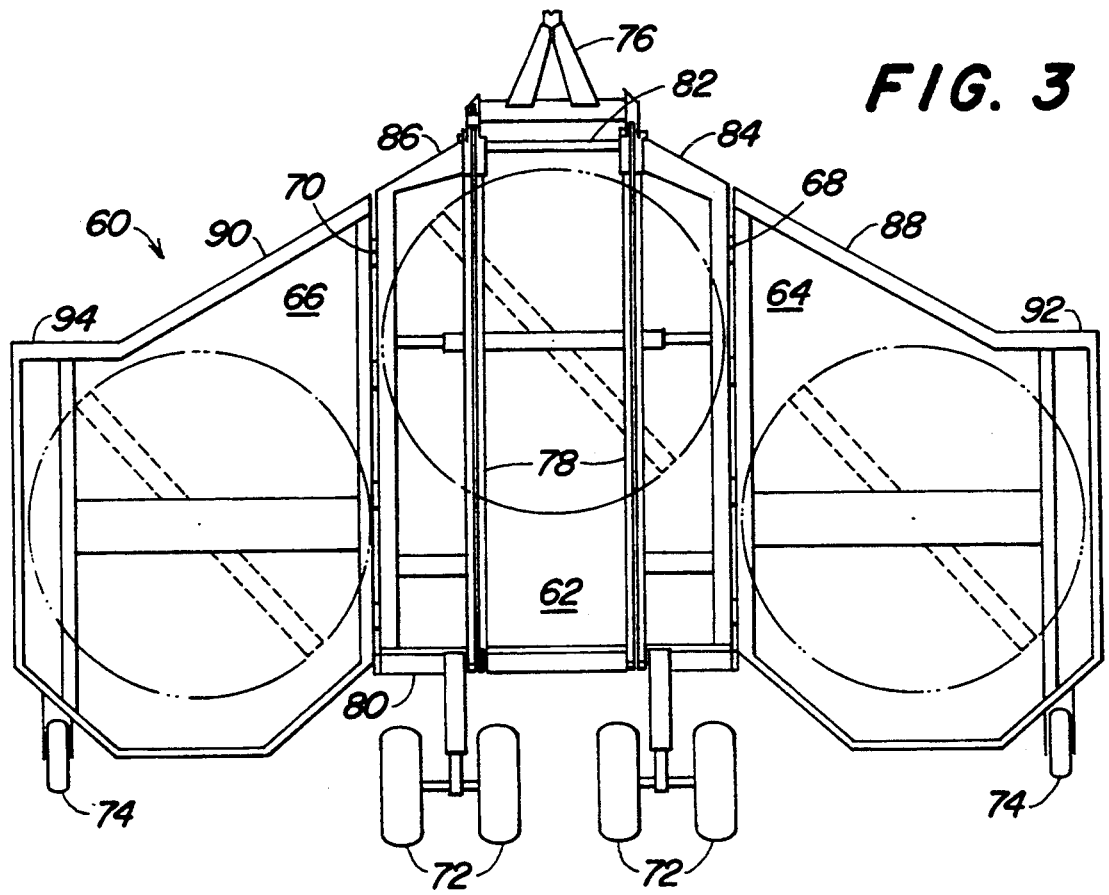
FIG. 3 is a somewhat schematic representation of a winged rotary cutter having a front profile designed in accordance with the principles of the present invention.

Referring now to FIG. 3, there is shown a rotary cutter 60 embodying the present invention. Specifically, the rotary cutter 60 includes a main frame defined by a center housing section 62 having right and left housing sections 64 and 66, respectively, hinged, as at 68 and 70, to opposite sides of the central section 62 for flexing vertically relative to the central section. Like the prior art cutters described above, hydraulically operated linkage (not shown) is connected between the center and right and left housing sections for raising the right and left housing sections to transport positions. Two pairs of ground wheels 72 are mounted to the center housing section 62 while wheels 74 are mounted to the wing housing sections 64 and 66. A hitch 76 is pivotally mounted to the front of the center housing section 62. Leveling rods 78 are coupled between the hitch 76 and a wheel axle 80 which is pivotally mounted to the rear of the housing section 62.

The forward profile of the center housing section 62 includes a middle section 82 that extends at right angles to the direction of travel and is flanked by right and left sections 84 and 86 which are rearwardly and outwardly angled from right and left hand ends of the middle profile section 82. The forward profile of the right and left hand housing sections 64 and 66 respectively include inner sections 88 and 90 which form rearwardly and outwardly inclined extensions of the right and left hand profile sections of the center housing section 62. The right and left wing housing sections 64 and 66 further include respective outer sections 92 and 94 which are disposed at right angles to the direction of travel of the cutter 60. Rotary cutters of the winged type are in a variety of widths. However, the length of the outer profile sections 92 and 94 are chosen so as to be aligned with rows of plants typically planted in rows spaced apart by 30, 36, 38 or 40 inches. While the outer profile sections 92 and 94 are shown as being disposed at right angles to the direction of travel, they could be angled forwardly a slight amount without affecting their operation of aiding in effecting a clean cut of the crop stems or stalks traversed by the profile sections.

In operation, the rotary cutter 60 is towed over a swath of plants so as to sever their stalks or stems from the ground. These plants may either be dense growths or planted in rows. In any event, the inclined profile sections 84 and 88 respectively of the center and wing housing sections 62 and 64, and the profile sections 86 and 90 of the center and wing housing sections 62 and 66 will tend to deflect crop stems or stalks outwardly. These stalks or stems will pass beneath the housing sections 62, 64 and 66 and be raised by the suction of the blades such that they are evenly cut off at a desired height. However, stalks or stems encountered by the center profile section 82 of the center housing section 62 and the wing profile sections 92 and 94 respectively of the wing housing sections 64 and 66 will be bent forwardly so that they too pass beneath the housing sections where they are raised by the suction of the blades and cut off cleanly at the desired height. Thus, it will be appreciated that the cutter 60 will cleanly cut off plant stems or stalks over the entire width of the cutter. In other words, the effective cutting width of the cutter 60 is the entire width of the swath covered by the housing sections 62, 64 and 66. Further, it will be appreciated that due to the profile sections 92 and 94, either end of the cutter 60 may be operated adjacent a building or fence row without leaving an objectionable strip of uncut plants at the end of the cutter closest to the building or fence row.

While the rotary cutters disclosed herein are of the towed, winged variety, it is to be noted that the inventive principle could be applied to integral and/or fixed housing types of cutters.

I claim:

1. In a rotary cutter including a center housing section having right and left wing sections hinged thereto for movement about respective fore-and-aft extending axes, said leading profile sections extending outwardly and rearwardly in inclined relationship to a forward direction of travel of the cutter, the improvement comprising:
    said right and left with sections further including outer leading profile sections respectively joined to rear ends of the inner leading profile sections, and outer leading profile sections extending at right angles to the direction of travel and terminating at extreme right and left ends of the cutter; and,
    said outer leading profile sections serving to bend plant stems and stalks over in the forward direction prior to being contacted and cut off by the said rotary cutter and able to mow a swath which is the entire width traversed by the said rotary cutter.

2. In a rotary cutter including a center housing section having a hitch pivotally connected to a forward end thereof and right and left wing housing sections respectively hinged to right and left sides thereof for flexing about respective fore-and-aft axes, each housing section being supported at its rear end by a ground wheel assembly, and said wing housing sections including respective inner leading profile sections diverging rearwardly relative to each other, the improvement comprising:
    said inner leading profile sections each having a rear end terminating at an outer leading profile section extending outwardly by rearwardly relative to said rear end of the leading profile section and terminating at an outer extreme of said housing; and,
    said outer leading profile sections serving to bend plant stems and stalks over in the forward direction prior to being contacted and cut off by said rotary cutter and able to mow a swath which is the entire width traversed by said rotary cutter.

* * * * *